US012710635B2

(12) United States Patent
Oreopoulos et al.

(10) Patent No.: US 12,710,635 B2
(45) Date of Patent: Aug. 18, 2026

(54) MICROSCOPE SYSTEM WITH OBLIQUE ILLUMINATION

(71) Applicant: Andor Technology Limited, Belfast (GB)

(72) Inventors: John Oreopoulos, Richmond Hill (CA); Peter Sinclair, Toronto (CA)

(73) Assignee: Andor Technology Limited, Belfast (GB)

( * ) Notice: Subject to any disclaimer, the term of this patent is extended or adjusted under 35 U.S.C. 154(b) by 910 days.

(21) Appl. No.: 17/718,632

(22) Filed: Apr. 12, 2022

(65) Prior Publication Data

US 2022/0326498 A1 Oct. 13, 2022

(30) Foreign Application Priority Data

Apr. 13, 2021 (GB) ..................................... 2105232

(51) Int. Cl.
*G02B 21/08* (2006.01)
*F21V 8/00* (2006.01)
*G02B 21/02* (2006.01)
*G02B 21/16* (2006.01)

(52) U.S. Cl.
CPC ......... *G02B 21/084* (2013.01); *G02B 6/0006* (2013.01); *G02B 21/02* (2013.01); *G02B 21/16* (2013.01)

(58) Field of Classification Search
CPC .... G02B 21/084; G02B 21/082; G02B 21/10; G02B 21/06; G01N 21/648
See application file for complete search history.

(56) References Cited

U.S. PATENT DOCUMENTS

2010/0208339 A1* 8/2010 Kleppe .................. G02B 21/06 359/385
2012/0140057 A1* 6/2012 Borck .................... G02B 27/58 359/381
2014/0104680 A1* 4/2014 Berman ............ G02B 21/0076 359/385

(Continued)

FOREIGN PATENT DOCUMENTS

WO 2020/224882 A1 11/2020

OTHER PUBLICATIONS

Search Report for Application GB2105232.9, Dated Dec. 21, 2021, nine pages.

(Continued)

*Primary Examiner* — Cara E Rakowski
(74) *Attorney, Agent, or Firm* — Warner Norcross + Judd LLP

(57) ABSTRACT

A microscope system has an illumination optical system comprising a multi-mode optical fibre having an egress for emitting a laser beam. The egress is located in a plane that is conjugate to the microscope sample plane. The illumination optical system is configured such that the laser beam is incident at the objective lens laterally displaced from the principal optical axis of the objective lens in order that the objective lens delivers the laser beam to the sample plane at an angle that is oblique to the principal optical axis. Utilization of a multi-mode optical fibre for laser delivery in oblique illumination microscopy, such as TIRF microscopy, solves problems associated with using single-mode optical fibres such as alignment and uniformity of illumination.

19 Claims, 3 Drawing Sheets

(56) References Cited

U.S. PATENT DOCUMENTS

| | | | | |
|---|---|---|---|---|
| 2015/0049376 | A1 | 2/2015 | Matsumoto et al. | |
| 2015/0131142 | A1 | 5/2015 | Matsumoto et al. | |
| 2018/0306721 | A1* | 10/2018 | Nakada | G01N 21/648 |
| 2020/0150043 | A1* | 5/2020 | Kleppe | G02B 21/361 |
| 2020/0409133 | A1* | 12/2020 | Cooper | G02B 6/0008 |
| 2021/0199944 | A1* | 7/2021 | Suzuki | G02B 21/002 |

OTHER PUBLICATIONS

Pedro Almada et al., "Palm and Storm: Into large fields and high-throughput microscopy with sCMOS dectectors," published in 2015, vol. 88, pp. 109-121.

* cited by examiner

LASER

MICROSCOPE SYSTEM WITH OBLIQUE ILLUMINATION

FIELD OF THE INVENTION

The present invention relates to oblique illumination microscopy, particularly, but not exclusively, to Total Internal Reflection (TIR) microscopy.

BACKGROUND TO THE INVENTION

In optical microscopy, oblique illumination involves illuminating the sample from an angle that is oblique with respect to the optical axis of the microscope. Oblique illumination can allow the sample to be observed with higher contrast than is obtained using brightfield illumination parallel with the optical axis, and this can improve the visibility of the sample. For example, oblique illumination is particularly suited for use with transparent or colourless samples.

TIR microscopy, including Total Internal Reflection Fluorescent (TIRF) microscopy, is widely recognized as one of the best surface examination imaging methods and is routinely used for observing biological interactions at cellular membrane interfaces. Most commercial TIRF microscopes utilize a single-mode optical fibre to deliver laser light through a high numerical aperture objective lens at an oblique angle. However, single-mode optical fibres are difficult to align, and suffer from wavelength and power limitations. In addition, when used as a source for TIRF illumination, single-mode optical fibres present non-uniform (Gaussian) illumination profiles, and the coherent nature of the light emanating from the fibre is prone to the generation of interference fringes that distort and degrade the quality of the TIRF image. A number of TIR microscopy applications, for example quantitative TIRF imaging and associated super-resolution imaging applications, would benefit from elimination or mitigation of the disadvantages associated with single-mode optical fibre laser delivery.

SUMMARY OF THE INVENTION

From a first aspect, the invention provides a microscope system for imaging a sample located in a sample plane, the system comprising:

- a microscope objective lens;
- an illumination optical system configured to illuminate the sample plane with a light beam through the objective lens, the illumination optical system comprising a multi-mode optical fibre having an egress for emitting said light beam,
- wherein the illumination optical system is configured such that said egress is located in a beam egress plane that is conjugate to the sample plane,
- and wherein the illumination optical system is configured such that said light beam is incident at said objective lens laterally displaced from the principal optical axis of the objective lens in order that the objective lens delivers said light beam to the sample plane at an angle that is oblique to the principal optical axis.

Preferably, the illumination optical system is configured such that said light beam is incident at a periphery of said objective lens.

Preferably, the illumination optical system is configured to image the beam egress plane to an equivalent sample plane that is intermediate to and conjugate to said beam egress plane and to said sample plane. The preferred illumination optical system comprises at least one lens configured to image said beam egress plane to said equivalent sample plane.

In preferred embodiments, the illumination optical system comprises at least one collimating lens having a front focal plane coincident with said beam egress plane and a back focal plane, and wherein said illumination optical system is configured to relay the back focal plane of said at least one collimating lens to the back focal plane of said objective lens. Preferably, said at least one lens comprises said at least one collimating lens and at least one imaging lens, wherein said at least one imaging lens is configured to form an image of the beam egress at said equivalent sample plane.

Preferably, the illumination optical system comprises at least one lens located between said equivalent sample plane and said objective lens and configured to collimate light from said equivalent sample plane to the back focal plane of the objective lens. Optionally, said at least one lens comprises a microscope tube lens.

In preferred embodiments, the illumination optical system includes positioning means for positioning said light beam such that said light beam is incident at said objective lens laterally displaced from the principal optical axis of the objective lens. The positioning means may comprise one or more optical component configured to move said light beam with respect to a principal optical axis of the microscope system, optionally to tilt said light beam and/or to move said light beam laterally with respect to said principal axis. Said at least one collimating lens is optionally positioned such that its optical axis is laterally displaced from a principal optical axis of the microscope system.

In preferred embodiments, said multi-mode optical fibre is coupled to a light source for generating said light beam. The light source is typically a laser light source and said light beam is a laser beam, preferably a homogenised laser beam.

In some embodiments, the illumination optical system is configured such that said angle causes total internal reflection at a sample interface.

Advantageously, said illumination optical system is configured to focus said beam egress onto said sample plane, or more particularly to focus the light at said beam egress to said sample plane.

In preferred embodiments, said illumination optical system includes at least one collimating lens arranged to collimate light from said beam egress, and at least one lens arranged to relay light collimated by said at least one collimating lens to the back focal plane of the objective lens. Said at least one relaying lens is preferably configured to relay light from the back focal plane of said at least one collimating lens to the back focal plane of the objective lens.

Advantageously, said illumination optical system is configured to image said beam egress to said sample plane, or more particularly to image the light at said beam egress to said sample plane.

Preferably, said multi-mode fibre has a square or rectangular cross-sectional shape.

Typically, said illumination optical system includes means for homogenizing said light beam.

From a second aspect the invention provides an illumination optical system for a microscope system for imaging a sample located in a sample plane, the illumination optical system being configured to illuminate the sample plane with a light beam through an objective lens of the microscope system, the illumination optical system comprising a multi-mode optical fibre having an egress for emitting said light beam, wherein the illumination optical system is configured such that said egress is located in a beam egress plane that is conjugate to the sample plane, and wherein the illumination optical system is configured such that said light beam is incident at said objective lens laterally displaced from the principal optical axis of the objective lens in order that the objective lens delivers said light beam to the sample plane at an angle that is oblique to the principal optical axis.

From a third aspect the invention provides a method of illuminating a sample plane of a microscope system through an objective lens, the method comprising: locating a light beam egress of a multi-mode optical fibre in a beam egress plane that is conjugate to the sample plane; illuminating said sample plane using a light beam from the multi-mode optical fibre; and causing said light beam to be laterally displaced from a principal optical axis of said objective lens when incident on said objective lens. Preferably, the method includes focusing and/or imaging said beam egress onto said sample plane. Preferably, the method includes collimating light from said beam egress, and relaying the collimated light to a back focal plane of the objective lens, and wherein, preferably, said relaying involves relaying light from the back focal plane of at least one collimating lens to the back focal plane of the objective lens.

From a fourth aspect the invention provides a microscope system for imaging a sample located in a sample plane, the system comprising:

a. a microscope objective lens;

b. an illumination optical system configured to illuminate the sample plane with a light beam through the objective lens, the illumination optical system comprising a multi-mode optical fibre having an egress for emitting said light beam, wherein the illumination optical system is configured to image and/or focus said egress to the sample plane, and wherein the illumination optical system is configured such that said light beam is incident at said objective lens laterally displaced from the principal optical axis of the objective lens in order that the objective lens delivers said light beam to the sample plane at an angle that is oblique to the principal optical axis.

From a fifth aspect the invention provides an illumination optical system for a microscope system for imaging a sample located in a sample plane, the illumination optical system being configured to illuminate the sample plane with a light beam through an objective lens of the microscope system, the illumination optical system comprising a multi-mode optical fibre having an egress for emitting said light beam, wherein the illumination optical system is configured to image and/or focus said egress to the sample plane, and wherein the illumination optical system is configured such that said light beam is incident at said objective lens laterally displaced from the principal optical axis of the objective lens in order that the objective lens delivers said light beam to the sample plane at an angle that is oblique to the principal optical axis.

From a sixth aspect the invention provides a method of illuminating a sample plane of a microscope system through an objective lens, the method comprising: illuminating said sample plane using a light beam from the multi-mode optical fibre; imaging and/or focusing a beam egress of the multi-mode fibre to the sample plane; and causing said light beam to be laterally displaced from a principal optical axis of said objective lens when incident on said objective lens.

Conventionally, using single mode fibres, the laser profile is Gaussian, and it stays that way (only changing in size) at the sample plane, the back focal plane and any equivalent planes. This is a special property of single mode fibres and Gaussian beams (the Fourier transform of a Gaussian beam is another Gaussian beam). Accordingly, in conventional arrangements where the tip of a single mode fibre is imaged to the BPF of the objective lens, the Gaussian illumination profile at the fibre tip is imaged to the BPF of the objective lens and is also reproduced at the sample plane. In contrast, multi-mode fibres do not have the same property and so where and how the beam from a multi-mode fibre is imaged is more important in order to produce the desired illumination of the sample plane, which is advantageously non-Gaussian. In preferred embodiments of the invention, the tip of the multi-mode fibre is imaged to the sample plane. This is in contrast to the conventional arrangement of imaging the tip of a single mode fibre to the BPF of the objective lens.

In preferred embodiments, oblique illumination, optionally total internal reflection (TIR) illumination, is implemented through a microscope utilizing a multi-mode optical fibre. Advantageously, the fibre egress, or tip, is arranged to be conjugate to the microscope sample plane (e.g. providing critical illumination of the sample). The preferred arrangement is such that light emanating from the fibre is focused and positioned at the periphery of an objective lens, preferably with a numerical aperture of 1.4 or greater, at or beyond the critical angle to produce total internal reflection (TIR) at the substrate-sample interface, or otherwise to illuminate the sample at an angle that is oblique with respect to the main optical axis of the microscope.

In preferred embodiments, laser light from one or more lasers is generated and scrambled in a laser engine containing a homogenizer. The laser light is coupled into a multi-mode optical fibre and the egress tip of the fibre is located at the focus of a first lens, preferably a collimating lens. A second lens, preferably being of larger focal length than the first lens, creates an image, preferably an enlarged image, of the fibre tip at an equivalent sample plane. The image of the fibre tip is relayed through a microscope objective lens, typically via a beam splitter, e.g. dichroic mirror, and projected or focused onto the sample plane (at which a target object or sample, e.g. a specimen on a substrate, is located). Light, e.g. fluorescence, emanating from the sample is captured by the objective lens and focused via a microscope tube lens onto the detector element of a light detector (typically via the beam splitter and an emission filter). Advantageously, the plane of the fibre tip, the equivalent sample plane, the sample plane and the plane of the detector element are all conjugate to each other. Typically, one or more optical elements capable of translating the beam laterally with respect to the microscope optic axis are used to position the laser beam at the periphery of the objective lens back-focal plane (BFP), preferably such that the laser beam undergoes total internal reflection at the substrate-sample interface. In some embodiments, this lateral translational motion of the beam is achieved with a rotating flat optic (TO) placed between the first and second lenses. In other embodiments, lateral translation motion of the beam is accomplished by laterally translating a third lens, located between the second lens and the objective lens, with respect to the microscope optic axis.

Utilization of a multi-mode optical fibre for laser delivery in TIRF microscopy, or oblique illumination microscopy, solves the above-identified problems associated with single-mode optical fibres. When used as an illumination source, the scrambled or homogenized output of the multi-mode optical fibre provides a flat, uniform, interference fringe-free illumination profile. This facilitates the prevention/elimination of image artifacts resulting from interference fringes superimposed on, for example, fluorescent images of biological specimens when using coherent free-spaced launched laser beams or coherent laser beams launched single-mode optical fibers that feed into traditional TIRF illumination systems. In addition, the multi-mode fibre is easier to align, has a wider spectrum of permitted laser wavelengths (extending into UV and NIR), and permits more laser power to be input onto the sample.

Advantageously, some embodiments of the invention facilitate implementation of imaging applications that require high laser power TIR illumination (e.g. super-resolution imaging of biological membrane surfaces). The invention is not limited for use with fluorescence applications. For example, embodiments of the invention may be used in metrology via reflected light imaging for physical sciences. Embodiments of the invention may be adapted for use as a stand-alone illumination module that fits to existing microscopes, or may be integrated into a microscope or other imaging or analysing system.

BRIEF DESCRIPTION OF THE DRAWINGS

An embodiment of the invention is now described by way of example and with reference to the accompanying drawings in which.

DETAILED DESCRIPTION OF THE DRAWINGS

Figures 1, 2A, 2B:
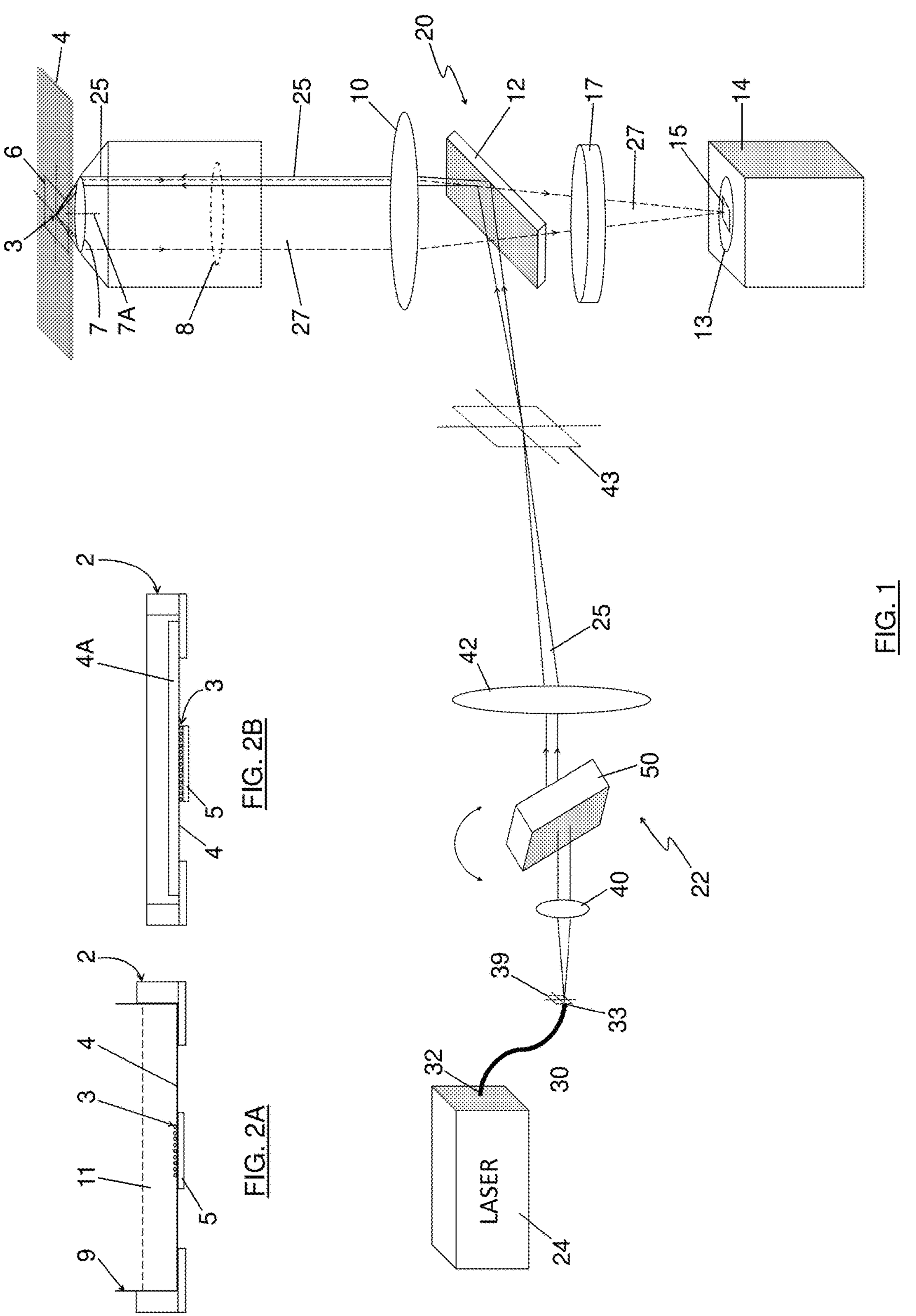
FIG. 1 is a schematic diagram of a microscope system embodying one aspect of the invention and including an illumination system embodying another aspect of the invention.
FIG. 2A is a side view of a first exemplary sample holder for holding a sample to be imaged by the microscope system.
FIG. 2B is a side view of a second exemplary sample holder for holding a sample to be imaged by the microscope system.

Referring now to FIGS. 1, 2A and 2B of the drawings there is shown, generally indicated as 100, a microscope system embodying one aspect of the invention. The microscope system 100 comprises an optical microscope, in preferred embodiments a widefield microscope, although microscopes of other types may be used as would be apparent to a skilled person.

The microscope system 100 includes a support or holder 2 for receiving an object 3 to be imaged. The object 3 typically comprises a sample, for example a biological specimen or chemical substance. The object or sample 3 may be located on a substrate 4, e.g. on a slide 4A in the example of FIG. 2B, or in a container 9 in the example of FIG. 2A, wherein at least part of the sample is usually present at the bottom of the container 9. The sample may be immersed in a medium, typically a liquid medium, e.g. water, or an aqueous biological medium. In the example of FIG. 2A, the sample 3 is provided in a liquid medium 11 in the container 9. A cover slide 5 may be placed over the sample or specimen, as required, typically being located between the sample and the objective lens of the microscope system. In the example of FIG. 2B, the sample 3 is located between the slide 4A and the cover slide 5, and may be immersed in any suitable medium. The object, or sample, 3 is located in a sample plane 6.

The microscope system 100 includes an imaging optical system 20 for imaging the sample 3 to an optical detector 14, which typically comprises a camera. The imaging optical system 20 is configured to focus an image of the sample 3 at a focal plane 13 of the detector 14, e.g. at the image sensor of a camera. The imaging optical system 20 may take a variety of configurations, typically comprising a train of optical devices that provide an optical path. The optical train usually comprising at least one lens arranged to image the sample 3 to the detector 14, i.e. form an image of the sample 3 at the detector focal plane via the optical train. The optical train may comprise one or more other optical components, e.g. one or more mirror and/or one or more beam splitter and/or one or more filter, as required. In preferred embodiments, the optical detector 14 is a digital camera having a digital image sensor 15, for example a CCD sensor. The imaging optical system 20 images the sample 3 to the image sensor 15. More particularly, it is desired that the imaging optical system 20 focuses an image of the sample 3 on the sensor 15 (wherein the image sensing surface of the sensor 15 is located at the focal plane 13 of the imaging optical system 20).

The imaging optical system 20 comprises a microscope objective lens 7, typically an infinity-corrected microscope objective lens, having a back focal plane (BFP) 8. The objective 7 has an optical axis that is typically perpendicular with the object plane 6.

The imaging optical system 20 typically comprises at least one tube lens 10, configured to form, together with the objective 7 a magnified image of the sample 3 at the detector 14. It will be understood that the optical train of the imaging optical system 20 may include one or more additional optical components depending on the embodiment.

The microscope system 100 includes an illumination optical system 22 for illuminating the sample 3. The illumination optical system 22 includes, or is connectable to, a light source 24, which in preferred embodiments is a laser light source comprising one or more laser devices (not shown), but which may alternatively comprise any other suitable conventional light source, for example one or more LEDs. The light source 24 may be configured to produce light, preferably laser light, in one or more frequency bands as suits the application and as would be apparent to a skilled person. For example, in cases where the sample 3 comprises a specimen that is capable of fluorescence (either because it is inherently capable of fluorescence, i.e. auto-fluorescence, or because one or more fluorescent markers (e.g. proteins or dyes) have been added to the specimen), the light source 24 may be configured to provide light in one or more frequency bands that excites the specimen/markers and causes fluorescence.

In preferred embodiments, the illumination optical system 22 is configured to illuminate the sample 3 by directing a beam 25 of light (a laser beam in the present example), which may comprise light at any one or more of a plurality of wavelengths corresponding to the fluorescence characteristics of the specimen/markers) to the sample 3 through the objective 7. Preferably, there is a single light beam 25. The light beam 25 is preferably homogenized. Preferably the beam 25 comprises incoherent light. The illumination optical system 22 comprises a train of optical components, one or more of which are shared in preferred embodiments with the optical train of the imaging optical system 20. As such the illumination light 25 may be directed along or parallel with at least part of the optical path of the imaging optical system 20. To facilitate this, a beam splitter 12 may be included in the imaging optical system 20 or otherwise provided in the optical path. The beam splitter 12 is configured so that light from the light source 24 reaches the sample 3, while light 27 emanating from the sample 3 reaches the optical detector 14. In the illustrated embodiment, the beam splitter 12 is configured to be reflective or partially reflective (i.e. to split) light in one or more frequency bands corresponding to the light produced by the light source 24. The light source 24 is arranged to direct the beam 25 to the beam splitter 12 whereupon at least part of the beam 25 is directed towards the sample 3 via the objective 7. In this example, the beam splitter 12 is configured to be transmissive to light in one or more frequency band corresponding to light that is reflected from, or emitted from, the sample 3, to allow the reflected/emitted light 27 to reach the optical detector 14. The beam splitter 12 may be said to have one or more transmission band corresponding to light that emanates from the sample 3, and one or more reflection band corresponding to the light produced by the light source 24. In the illustrated embodiment, the beam splitter 12 is located between the tube lens 10 and the optical detector 14. Typically, the beam splitter 12 comprises a dichroic mirror. In alternative embodiments, the tube lens 10 may be located elsewhere in the optical path, for example between the beam splitter 12 and the optical detector 14.

In some embodiments, the sample 3 comprises a sample that fluoresces (either by auto-fluorescence or by means of fluorescent markers (or labels) included in the sample) when excited by the light from the illumination optical system 22. Therefore, when the microscope 100 operates in an imaging mode, it is fluorescent light emitted from the sample that is imaged by the imaging optical system 20 to the camera 14.

Typically, an emission filter 17 is provided in the optical path for filtering the light 27 that emanates from the sample 3 in order to allow only light in one or more target wavelength bands to reach the optical detector 14. For example, the emission filter 17 may be configured to allow light in one or more wavelength band corresponding to the fluorescent light emitted from the sample during use. In cases where more than one target wavelength band may be of interest, a plurality of different interchangeable emission filters may be provided, e.g. in a filter selector device, to allow a suitable emission filter to be located in the optical path depending on the target wavelength band may be of interest at any given time. In the illustrated embodiment, the filter 17 is located adjacent the optical detector 14 but it may alternatively be located elsewhere in the optical path as is convenient.

Figure 3:
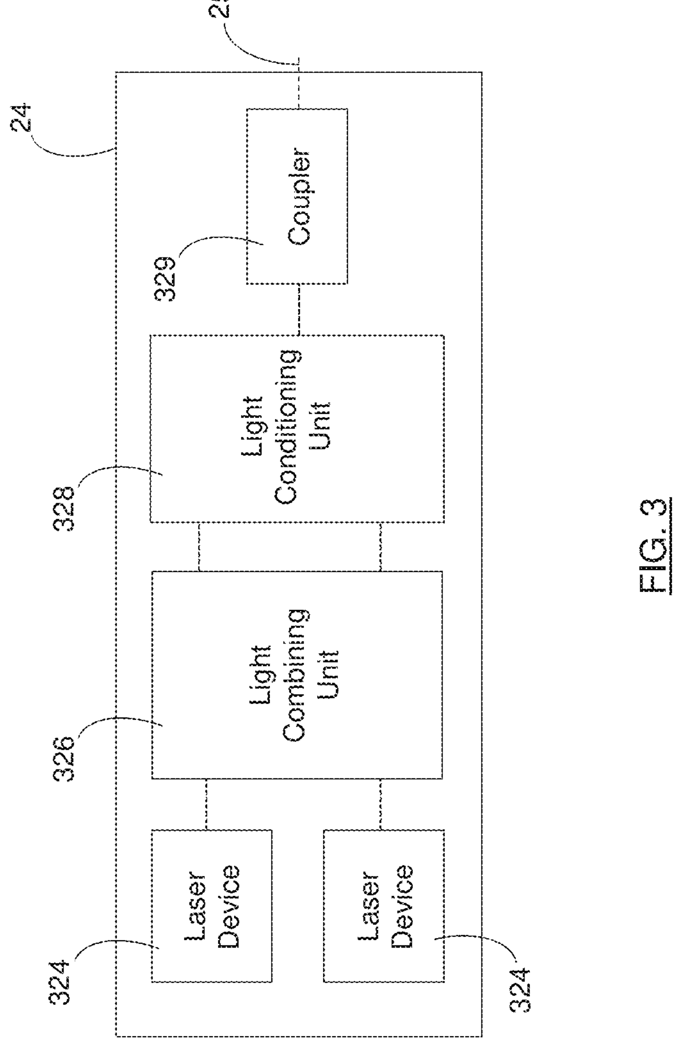
FIG. 3 is a block diagram of a light source module suitable for use with the microscope system of FIG. 1

FIG. 3 shows an example of a light source module that may be used as the light source 24. The light source module comprises one or more primary light source 324 for generating and emitting light. In typical embodiments the light is in the ultraviolet (UV), visible or NIR (near infrared) frequency bands. In preferred embodiments, the light is laser light and each light source 324 comprises a laser device. However, each light source may comprise any source able to generate and emit light, including but not limited to, light emitting diodes (LEDs), laser diodes, solid state devices, super luminescent diodes (SLDs) or arc lamps. Each light source 324 is configured to generate and emit light, or light, at one or more wavelengths. In the example of FIG. 3, two laser devices 324 are shown, but it will be understood that in alternative embodiments there may be a single light source or more than two light sources. Each laser device 324 may be a single mode laser device or a multi-mode laser device. In preferred embodiments, the light source module emits light, preferably laser light, at multiple wavelengths. As illustrated, this may be achieved by providing the module 24 with multiple light sources 324, each producing light at different wavelengths or in different frequency bands. Alternatively, the light source module 24 may emit light at a single wavelength.

In embodiments where the light source module has more than one light source 324, it may include a light combining unit 326 comprising one or more optical elements arranged in any conventional manner to combine the respective beams from each light source 324 to produce the output light beam 25. The light combining unit 326 may for example comprise one or more mirror and/or beam splitter and/or dichroic beam combiner.

Optionally, the light source module comprises a light control and conditioning unit 328 for manipulating the cross-sectional shape and/or dimensions of the beam 25 emitted from the module 24. In embodiments where there is more than one light source 324, the control and conditioning unit 328 may include a respective control and conditioning subunit (not shown) for each light source 324. The control and conditioning unit 328 (or each of its subunits as applicable) may comprise any optical element or combination of optical elements (not shown) for controlling and conditioning the emitted beam in any desired conventional manner. For example, the control and conditioning unit 328 (or each of its subunits as applicable) may comprise a Galilean telescopic beam expander, or anamorphic prismatic or cylindrical optics, and/or any other conventional beam shaping means, and/or an acousto-optic tunable filter (AOTF), or a mechanical shutter.

In the illustrated embodiment, the light combining unit 326 is located before the light conditioning unit 328 such that the light from the laser sources 324 is conditioned after it is combined. In alternative embodiments (not illustrated) the light combining unit 326 is located after the light conditioning unit 328 such that the light from the laser sources 324 is conditioned before it is combined.

The light source module 24 may include an optical coupler 329 through which the output light beam 25 is emitted from the module 24. The optical coupler 329 comprises one or more optical elements (not shown) for directing, or optically coupling, the beam to an optical fibre 30 (see FIG. 1). Typically, the optical coupler 329 comprises one or more lens (for example a collimator lens, a condenser lens and/or a micro-objective) for focusing the output beam onto the end of the optical fibre 30. The optical fibre 30 may be mechanically coupled to the module 24 using any convenient coupling device or means (not shown). Alternatively, the configuration may be such that the optical coupler 26 emits the beam 25 into free space, whereupon it is directed to the optical fibre 30.

The optical fibre 30 has an ingress end 32 for receiving the beam 25 from the light source 24. The ingress end 32 may receive the beam 25 from free space. In preferred embodiments, the optical coupler 329 is configured to focus the beam 25 onto the ingress end 32 of the fibre 30. The respective cross-sectional shape and size of the beam 25 and of the optical core of the fibre 30 are mutually compatible to allow the beam 25 to be transmitted along the fibre 30. This compatibility may be achieved, at least in part, by the control and conditioning unit 328.

The optical fibres 30 may be conventional, typically comprising an optically transparent core (not shown) for transmitting the beam 25, the core usually being surrounded by a transparent cladding material (not shown) with a lower index of refraction than the core. The core and cladding may be formed from any suitable material, e.g. glass (silica) or plastics. The fibre 30 may be described as an optical waveguide, and may take any known form, for example the type known as a light pipe, which comprises an optically transparent core (e.g. formed from glass or plastics) but may have no cladding.

Advantageously, the optical fibre 30 is a multi-mode optical fibre. A multi-mode optical fibre is an optical fibre that supports multiple light propagation paths or modes. The multiple light paths or light modes may be supported concurrently over a broad spectrum of wavelengths. In contrast, a single mode optical fibre supports only a single mode. Multi-mode fibres generally have a wider core diameter (typically 50-400 micrometres) than single mode fibres. The core diameter of a multi-mode optical fibre is larger than the wavelength of the light carried in it. The core of the multi-mode fibre 30 preferably has a square cross section or a rectangular cross section, but may alternatively have a circular cross section or cross section of any other suitable shape, and the beam 25 may be correspondingly shaped. By way of example, the optical fibre 30 may have a core diameter of 50 μm and a numerical aperture (NA) of 0.12. The multi-mode fibre 30 may be said to comprise an extended light source as opposed to a point light source. This facilitates illumination of the sample plane since the extended light source provides a larger field of illumination than a point light source.

The optical fibre 30 has a beam egress 33 at its end, or tip, from which the light beam 25 is emitted. The beam 25 may be emitted from the egress 33 into free space.

In preferred embodiments, the beam 25 emitted from the egress 33 of the multi-mode optical fibre 30 is homogenized, or scrambled, providing a flat, uniform, interference fringe-free illumination profile. Any conventional beam homogenizer or optical diffuser (not shown) may be provided for this purpose. For example, the light conditioning unit 328 may include a beam homogenizer or optical diffuser, although any such device(s) may be provided at any other suitable location in the illumination system. Advantageously, the homogenized beam 25 comprises incoherent light. In addition, in comparison with a single mode optical fibre, the multi-mode fibre 30 is easier to align, has a wider spectrum of permitted laser wavelengths (e.g. extending into UV and NIR), and permits more laser power to be delivered to the sample 3.

Figure 4:
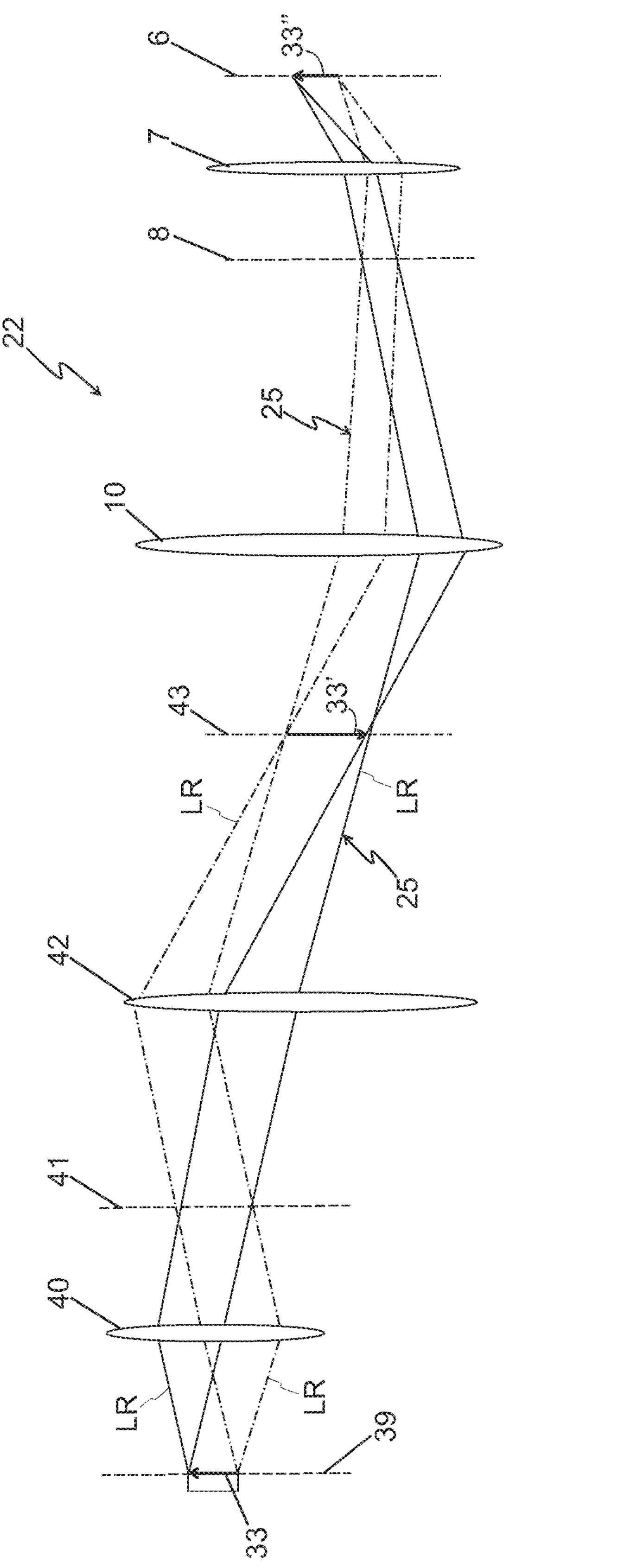
FIG. 4 is an alternative schematic representation of the illumination system of FIG. 1, including light rays illustrating the passage of light from a fibre tip to a sample plane.

With reference to FIGS. 1 and 4, the illumination optical system 22 is advantageously configured such that the egress or tip 33 of the optical fibre 30, or more particularly the beam 25 at the egress 33, is imaged to the sample plane 6. Preferably, the arrangement is such that an image, optionally an enlarged image, of the fibre tip 33 (or more particularly the light at the fibre tip) is focused onto the sample plane 6. In preferred embodiments, the illumination optical system 22 is configured to image the beam egress 33 to an intermediate optical plane that may be referred to as an equivalent sample plane (ESP) 43. As such, an image, optionally an enlarged image, of the egress 33 is provided at the ESP 43. The illumination optical system 22 is further configured to image the intermediate image at the ESP 43 to the sample plane 6. The ESP 43 is conjugate to the sample plane 6, and to the plane 39 in which the fibre tip 33, or beam egress, lies.

In preferred embodiments, the illumination optical system 22 includes a first lens 40, preferably a collimating lens. The arrangement is such that the beam egress 33 is located at a front focal plane 39 of the lens 40. The first lens 40 has a back focal plane (BFP) 41 and collimates the beam 25 from the egress 33 to the BFP 41. It is noted that the lens 40 does not create an image of the egress 33 at the BFP 41. This is illustrated in FIG. 4 from which it can be seen that the light rays LR from the egress 33 do not focus to form an image of the egress 33 at the BFP 41. Instead, the light from the egress 33 is preferably collimated or substantially collimated at the BFP 41.

The illumination optical system 22 is configured to relay the light at the BFP 41 to the BFP 8 of the objective lens 7. In preferred embodiments this is achieved using a second lens 42 and a third lens 10 arranged to serve as a set of image relay lenses. In the embodiment of FIG. 1, the third lens 10 is the tube lens of the microscope system 100. However, in other embodiments (not illustrated) the third lens 10 is not the tube lens, and may be any suitable lens provided between the ESP 43 and the BPF 8 (and which may be provided in addition to the tube lens).

In the preferred illumination optical system 22, the second lens 42, which may comprise any suitable imaging lens, is arranged such that the second lens 42 forms an intermediate image of the egress 33, or fibre tip, at the ESP 43. This is illustrated by the light rays LR from the egress 33 being focused at the ESP 43. Preferably, the second lens 42 is positioned such that its front focal plane coincides with the BFP 41. The preferred arrangement is such that the lens 42 provides a magnified image 33' of the beam 25 at egress 33 at the ESP 43, the magnification preferably being such that the magnified beam 25 fills or substantially fills the detector's field of view. Preferably, the focal length of the second lens 42 is larger than the focal length of the first lens 40. The third lens 10 collimates the beam 25 from the ESP 43 to the BPF 8 of the objective, which preferably corresponds with the BPF of the third lens 10. It is noted that the third lens 10 does not create an image of the egress 33 at the BFP 8. This is illustrated in FIG. 4 from which it can be seen that the light rays LR do not focus to form an image at the BFP 8. Instead, the light is preferably collimated or substantially collimated at the BFP 8.

The objective lens 7 forms an image 33" of the egress 33, or more particularly of the beam 25 at the egress 33, at the sample plane 6. In preferred embodiments, the objective lens 7 focuses the collimated light at the BFP 8 to the sample plane 6.

The preferred illumination optical system 22 is configured to project, or image, the intermediate image of beam 25 at the ESP 43 onto the sample plane 6, which is achieved by means of the third lens 10 and the objective 7 in preferred embodiments. In the embodiment of FIG. 1, the beam 25 is directed from the ESP 43 to the objective 7 via the beam splitter 12.

In preferred embodiments, the first lens 40 provides a collimated spot of light at the BPF 41, and it is this spot of light that is relayed to the BPF 8 of the objective lens 7 forming a corresponding spot of light at the BPF 8. The objective lens 7 focuses the light spot at the BPF 8 to form an image of the fibre tip 33 at the sample plane 6. Preferably, the illumination optical system 22 is configured to relay the smallest available collimated spot to the BPF 8, and this may be achieved by arranging lenses 40 and 42 such that the BPF 41 of lens 40 coincides with the front focal plane of lens 42. It is also preferred to focus the smallest available collimated spot from the BPF 8 onto the sample plane 6, and this may be achieved by arranging lenses 10 and 7 such that the BPF 41 of lens 10 coincides with the BPF 8 of the objective lens 7. In alternative embodiments, the respective focal planes do not have to be coincident, although this may have a negative affect on the sharpness of the image formed on the sample plane 6.

The preferred arrangement of the illumination optical system 22, in particular lenses 40 and 42 in the illustrated embodiment, is such that the plane 39 in which egress 33 is disposed (which corresponds to the front focal plane of lens 40 in the illustrated example) and the equivalent sample plane (ESP) 43 (which corresponds to the BFP of the second lens 42 in the illustrated example) are conjugate to each other. The preferred arrangement of the illumination optical system 22, in particular the lenses 10 and 7 in the illustrated embodiment, is such that the sample plane 6 and the ESP 43 are conjugate to each other. In preferred embodiments, the plane 39 of the egress 33, the ESP 43 and the sample plane 6 are conjugate to each other. It is further preferred that the detector focal plane 13 is conjugate to the sample plane 6, ESP 43 and egress plane 39.

The illumination optical system 22 is configured such that the illuminating beam 25 is laterally displaced from the principal optical axis 7A of the objective lens 7 when incident on the objective lens 7. Depending on the arrangement of the illumination optical system 22, the beam 25 may be parallel or substantially parallel with the optical axis 7A (as illustrated for example in FIG. 1), or may be oblique to the optical axis 7A as it impinges on the objective lens 7. Preferably, the configuration is such that the beam 25 is incident on the objective lens 7 at the periphery of the lens 7. This arrangement facilitates the objective 7 projecting the beam 25 to the sample plane 6 at an angle that is oblique to the optical axis. The configuration may be such that oblique illumination of the sample plane 6, and therefore of the sample is achieved. Optionally, the configuration is such that the beam 25 is projected to the sample plane 6 from the objective 7 at an angle that causes total internal reflection (TIR) of the beam 25, at or beyond the relevant critical angle. To facilitate TIR, it is preferred that the objective lens 7 has a relatively large numerical aperture, preferably 1.4 or higher. TIR occurs at a sample interface, which may be located in, or substantially in, the sample plane 6. For example, with reference to FIG. 2A, the sample interface may comprise the inner bottom surface of the container 9. Alternatively, in the example of FIG. 2B, the sample interface may be the surface of the cover slide 5 that faces the sample 3. For example, with an inverted microscope using a high numerical aperture objective lens, the sample substrate usually is a glass surface that has so-called "coverslip thickness". The objective lens is designed to image through a piece of glass with this thickness. TIR may occur at the substrate (coverslip)-sample or glass-water interface. The entire sample can be a biological specimen sandwiched between a thick glass slide 4 and a coverslip 5 (with water in between for the sample) and positioned upside-down on the inverted microscope. Alternatively, it may be a "dish" style sample (FIG. 2A), consisting of a walled chamber with a coverslip thickness bottom. The specimen is typically cultured on the glass coverslip of the chamber and water or another aqueous liquid fills the dish, open to the air above.

The desired positioning the beam 25 may be achieved using any convenient positioning means. For example, in FIG. 1 the illumination optical system 22 includes a translating optical device 50 between the first and second lenses 40, 42 which is configured or configurable to adjust the position of the beam 25 (e.g. move it laterally and/or adjust the angle of inclination) with respect to the principle axes of the lenses 40, 42, in particular the second lens 42, in order to control the position and/or angle of the beam 25 as it reaches the beam splitter 12 such that the beam 25 is positioned as desired when it reaches the objective 7. The translating optical device 50 may take any conventional form, e.g. a rotatable optic or optical translation stage or mount. Alternatively, or in addition, the desired positioning of the beam 25 may be achieved by positioning either one or both of the egress 33 and first lens 40 such that the beam 25 emerges from the first lens 40 along an axis that is displaced from the principal axis of the second lens 42. This is illustrated in FIG. 4, where the egress 33 and the first lens 40 are laterally displaced with respect to the second lens 42, the preferred arrangement being such that the principal axis of the first lens 40 spaced apart from and parallel with the principal axis of the second lens 42. More generally, the beam positioning means may be implemented by one or more optical device and/or optical configuration that cause the lateral position and/or angle of inclination of the beam 25 with respect to the principal optical axis or other reference axis to be set in the desired manner, optionally allowing for adjustment or tuning. For example, in alternative embodiments (not illustrated) the illumination optical system 22 may include one or more lens that is movable laterally (i.e. in a direction perpendicular to its principle axis) to position the beam 25 as required.

In use of the illustrated embodiment, the light generated by the light source is coupled into the multi-mode optical fibre 30 and the egress 33 of the fibre 30 is set at the focus of the first lens 40. The second lens 42 creates an image, optionally an enlarged image, of the egress 33 at the equivalent sample plane (ESP) 42. The image, or enlarged image, of the beam 25 the egress 33 is then relayed through the microscope 100 and projected onto the sample plane 6 of the target sample (typically a microscopic specimen on a substrate 4) through the objective lens 7 and, in this example, via beam splitter 12. The light 27 (typically fluorescent light) emanating from the sample 3 is captured by the objective 7 and focused by the microscope tube lens 10 on the optical detector 14 (via the beam splitter 12 and emission filter 17 in the illustrated embodiment). Advantageously, the egress plane 39, ESP 43, sample plane 6, and preferably also the detector focal plane 13, are all conjugate to each other.

The preferred illumination optical system 22 is configured to position the beam 25 at the periphery of the objective lens back-focal plane (BFP) 8 such that the beam 25 undergoes total internal reflection at the sample interface, or otherwise obliquely illuminates the sample plane 6. Positioning of the beam 25 may be effected by one or more optical elements capable of translating the beam laterally with respect to the microscope optic axis. Advantageously, the illumination optical system 22 is configured to direct the homogenized, or incoherent, beam 25 from the fibre 30 to the sample plane 6. Advantageously, the illumination optical system 22 is configured to image the tip, or egress, of the fibre 30 to the sample plane 6, in particular to image the light at the beam egress to said sample plane.

In alternative embodiments (not illustrated) either one or both of the imaging optical system 20 and the illumination optical system 22 may have different optical components and/or a different arrangement of optical components than as illustrated in FIGS. 1 and 4. For example, the beam splitter 12 may be located between the tube lens 10 and the objective 7. One or more additional lens (not shown) may be provided between the ESP 43 and the objective 7 (e.g. between the ESP 43 and the beam splitter 12, or between the beam splitter 12 and the objective 7), to serve as the third lens (as described above and shown in FIG. 4 as lens 10) instead of the tube lens 10 in the example of FIG. 1. Optionally, the or each additional lens may be laterally movable with respect to the optical axis as described above to position the beam 25 as desired.

In alternative embodiments (not illustrated), any one or more of the lenses described herein may be implemented as a single lens or as an arrangement of lenses, as would be apparent to a skilled person.

Advantageously, in preferred embodiments, the illuminating optical system 22 is configured to project, and in particular to image, the structureless pattern of the homogenized beam 25 from the multi-mode fibre 30 onto the sample plane. The sample plane, and therefore the sample, is therefore illuminated uniformly across the field of view of the microscope, devoid of any interference patterns which would degrade the image quality.

The invention is not limited to the embodiment(s) described herein but can be amended or modified without departing from the scope of the present invention.

The invention claimed is:

1. A microscope system for imaging a sample located in a sample plane, the system comprising:

a microscope objective lens;

an illumination optical system configured to illuminate the sample plane with a light beam through the objective lens, the illumination optical system comprising a multi-mode optical fibre having an egress for emitting said light beam, wherein the illumination optical system is configured such that said egress is located in a beam egress plane that is conjugate to the sample plane, said illumination optical system being configured to form an image of said egress of said multi-mode optical fibre at said sample plane, and wherein the illumination optical system is configured such that said light beam is incident at said objective lens laterally displaced from the principal optical axis of the objective lens in order that the objective lens delivers said light beam to the sample plane at an angle that is oblique to the principal optical axis.

2. The microscope system of claim 1, wherein the illumination optical system is configured such that said light beam is incident at a periphery of said objective lens.

3. The microscope system of claim 1, wherein the illumination optical system is configured to image the beam egress plane to an equivalent sample plane that is intermediate to and conjugate to said beam egress plane and to said sample plane.

4. The microscope system of claim 3, wherein the illumination optical system comprises at least one lens configured to image said beam egress plane to said equivalent sample plane, and wherein said at least one lens comprises said at least one collimating lens and at least one imaging lens.

5. The microscope system of claim 3, wherein said illumination optical system comprises at least one lens located between said equivalent sample plane and said objective lens and configured to collimate light from said equivalent sample plane to the back focal plane of the objective lens, and wherein said at least one lens comprises a microscope tube lens.

6. The microscope system of claim 4, wherein said at least one collimating lens is positioned such that its optical axis is laterally displaced from a principal optical axis of the microscope system.

7. The microscope system of claim 1, wherein the illumination optical system comprises at least one collimating lens having a front focal plane coincident with said beam egress plane and a back focal plane, and wherein said illumination optical system is configured to relay the back focal plane of said at least one collimating lens to the back focal plane of said objective lens.

8. The microscope system of claim 1, wherein said illumination optical system includes positioning means for positioning said light beam such that said light beam is incident at said objective lens laterally displaced from the principal optical axis of the objective lens, and wherein said positioning means comprises one or more optical components configured to move said light beam with respect to a principal optical axis of the microscope system, optionally to tilt said light beam and/or to move said light beam laterally with respect to said principal axis.

9. The microscope system of any preceding claim, wherein said multi-mode optical fibre is coupled to a light source for generating said light beam, and wherein said light source or said illumination optical system includes means for homogenizing the light beam or is otherwise configured such that said light beam is homogenized.

10. The microscope system of claim 9, wherein said light source is a laser light source and said light beam is a laser beam.

11. The microscope system of any claim 1, wherein the illumination optical system is configured such that said angle causes total internal reflection at a sample interface.

12. The microscope system of claim 1, wherein said illumination optical system is configured to focus said beam egress onto said sample plane.

13. The microscope system of claim 1, wherein said illumination optical system includes at least one collimating lens arranged to collimate light from said beam egress, and at least one lens arranged to relay light collimated by said at least one collimating lens to the back focal plane of the objective lens, and wherein said at least one relaying lens is configured to relay light from the back focal plane of said at least one collimating lens to the back focal plane of the objective lens.

14. The microscope system of claim 1, wherein said multi-mode fibre has a square or rectangular cross-sectional shape.

15. The microscope system of claim 1, wherein said illumination optical system includes means for homogenizing said light beam.

16. A method of illuminating a sample plane of a microscope system through an objective lens, the method comprising: locating a light beam egress of a multi-mode optical fibre in a beam egress plane that is conjugate to the sample plane; illuminating said sample plane using a light beam from the multi-mode optical fibre; and causing said light beam to be laterally displaced from a principal optical axis of said objective lens when incident on said objective lens, wherein said illuminating involves creating an image of said light beam egress of said multi-mode optical fibre at said sample plane.

17. The method of claim 16, further including focusing and/or imaging said beam egress onto said sample plane.

18. The method of claim 16, further including collimating light from said beam egress, and relaying the collimated light to a back focal plane of the objective lens.

19. A microscope system for imaging a sample located in a sample plane, the system comprising:

a microscope objective lens;

an illumination optical system configured to illuminate the sample plane with a light beam through the objective lens, the illumination optical system comprising a multi-mode optical fibre having an egress for emitting said light beam, wherein the illumination optical system is configured such that said egress is located in a beam egress plane that is conjugate to the sample plane, said illumination optical system being configured to create an image of said egress of said multi-mode optical fibre at said sample plane, wherein the illumination optional system includes at least one collimating lens arranged to collimate light from said egress, said egress being located at a front focal plane of said at least one collimating lens, a back focal plane of said at least one collimating lens being a conjugate plane to a back focal plane of the objective lens, and wherein the illumination optical system is configured such that said light beam is incident at said objective lens laterally displaced from the principal optical axis of the objective lens in order that the objective lens delivers said light beam to the sample plane at an angle that is oblique to the principal optical axis.

* * * * *